May 1, 1945.　　　　C. F. FREDE　　　　2,374,739
RAILWAY TRUCK STRUCTURE
Filed July 4, 1942　　　2 Sheets-Sheet 1

INVENTOR,
CHARLES F. FREDE
BY Rodney Bedell
ATTORNEY

May 1, 1945. C. F. FREDE 2,374,739
RAILWAY TRUCK STRUCTURE
Filed July 4, 1942 2 Sheets-Sheet 2

INVENTOR,
CHARLES F. FREDE
BY Rodney Bedell
ATTORNEY

Patented May 1, 1945

2,374,739

UNITED STATES PATENT OFFICE 2,374,739

RAILWAY TRUCK STRUCTURE

Charles F. Frede, University City, Mo., assignor to General Steel Castings Corporation, Granite City, Ill., a corporation of Delaware Application July 4, 1942, Serial No. 449,791

12 Claims. (Cl. 105—182)

The invention relates to railway rolling stock truck structure and more particularly to the mounting of the truck load carrying members and brake gear on the truck axles.

One object of the invention is to produce a truck having better riding qualities than trucks now in use and to simplify and lighten the truck structure without sacrificing essential strength.

Another object of the invention is to mount the wheeled axles, journal boxes, and equalizers in the truck so that these parts will move vertically relative to the truck frame without frictional contact of the journal boxes with the truck frame.

Another object is to mount brake gear mechanism such as the brake shoes, hangers, and levers so that they will move with the journal boxes, axles, and wheels rather than move relative thereto as would be the case if such parts were mounted on the truck frame.

These objects are accomplished by mounting the brake gear and pedestalless truck frame separately upon equalizers extending between journal boxes at the same side of the truck and providing anchor rods between the equalizer and the truck frame to hold them against relative movements longitudinally and transversely of the truck while yieldingly accommodating their relative vertical movements.

These and other detail objects of the invention are attained by the structure illustrated in the accompanying drawings in which—

Figure 1:
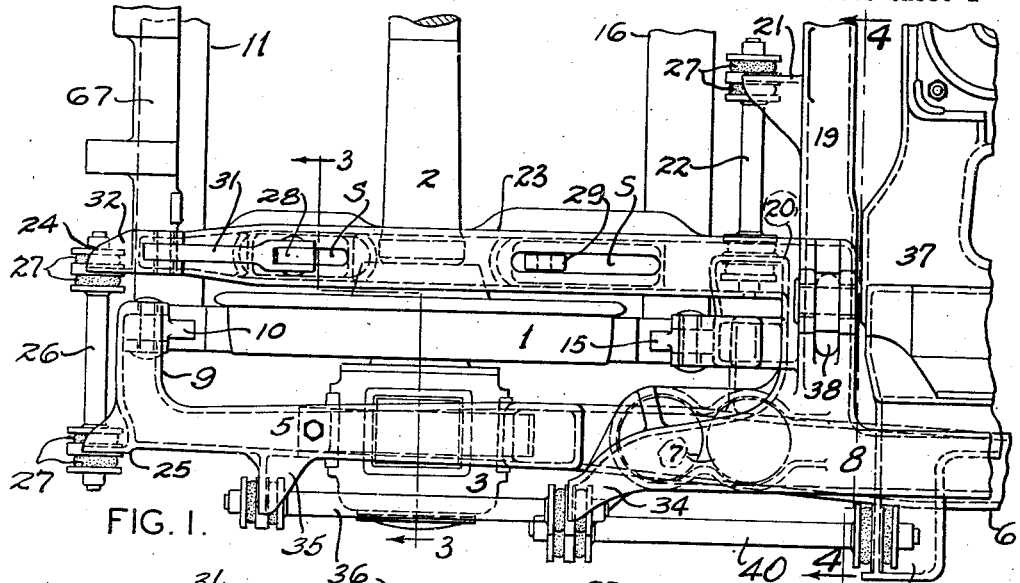
Figure 1 is a top view of one quarter of a four-wheel truck embodying the invention.
Figures 3, 7:
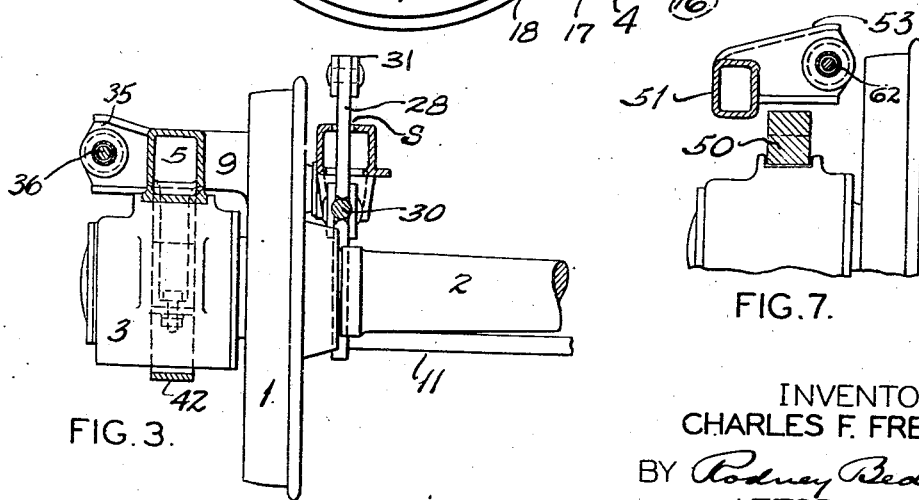
Figure 4:
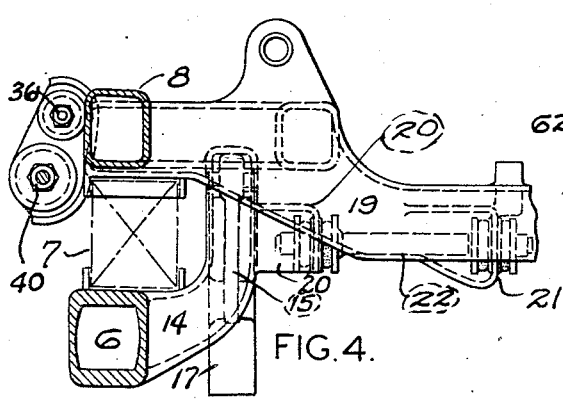

Figures 3 and 4 are detail vertical transverse sections taken on the lines 3—3 and 4—4 of Figure 1.

Figure 2:
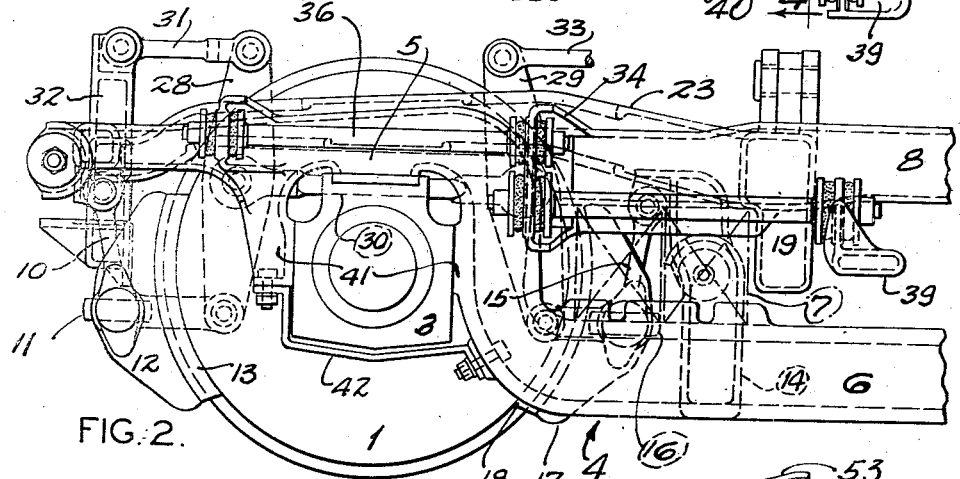
Figure 2 is a side elevation of the structure shown in Figure 1.
Figure 5:
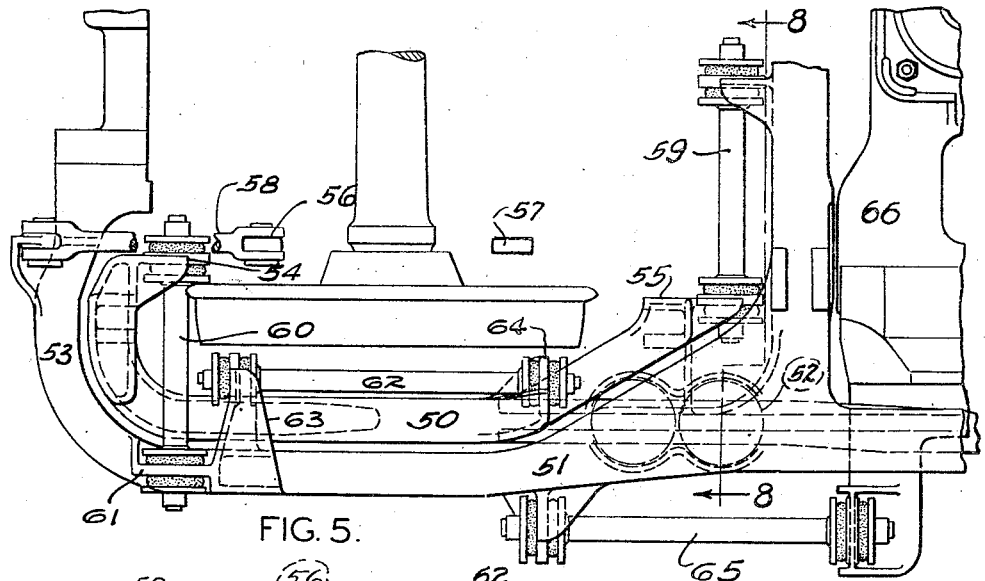
Figure 6:
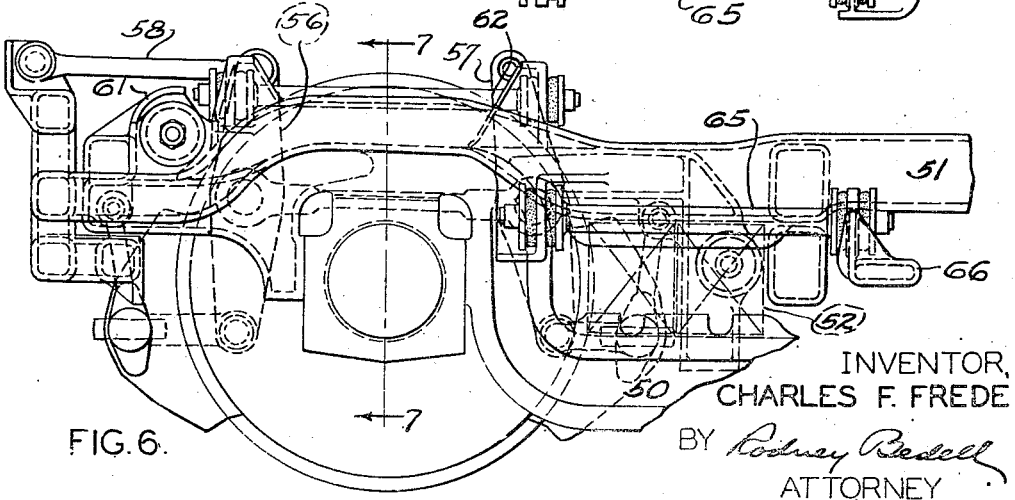

Figures 5 and 6 correspond to Figures 1 and 2 but illustrate another form of the invention.

Figure 7 is a detail vertical transverse section taken on the line 7—7 of Figure 6.

Figure 8:
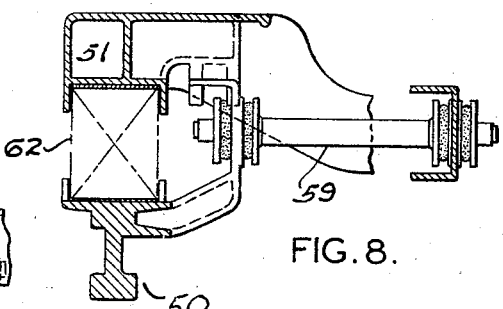

Figure 8 is a detail vertical transverse section taken on the line 8—8 of Figure 5.

It is to be understood that the parts shown in Figures 1, 2, 5 and 6 are duplicated at the opposite side of the truck and at the opposite end of the truck but are drawn as shown to utilize a larger scale, but, if desired, the end transom at the end not shown may be simplified or omitted.

Wheels 1 are fixed on axles 2, the outer ends of which mount journal boxes 3. Supported upon journal boxes 3 and extending between journal boxes at the same side of the truck are equalizers 4 independent of each other and having elevated portions 5 extending over the boxes and lower portions 6 providing seats for coil springs 7 which support the truck frame 8.

The outer end of each equalizer end portion 5 extends towards the end of the truck and terminates in an inwardly directed arm 9 from which is suspended the brake hanger 10 carrying one end of the brake beam 11 fitted with a head 12 and shoe 13 for application to the wheel. Projecting inwardly and upwardly from the equalizer lower portion 6 and abreast of the inner edge of the wheel is an arm 14, a brake hanger 15 being suspended from the inner end thereof for carrying another brake beam 16 with head 17 and shoe 18.

The part of the truck frame near the center of the truck includes spaced transverse transoms 19 positioned at a higher level than the equalizer main portion 6. A bracket 20 on the upper portion of arm 14 and a bracket 21 on transom 19 are aligned with each other transversely of the truck but spaced apart a substantial distance and are connected by a horizontal anchor rod 22 of the type illustrated in V. L. Green Reissue Patent No. 21,987, issued December 30, 1941.

Each corner of truck frame 8 includes a side piece 23 extending from transom 19 towards the end of the truck inwardly of wheel 1 and terminating in a bracket 24 opposite to but spaced from a bracket 25 on the end of equalizer 5. An end transom 67 connects the outer portions of side pieces 23 and is arranged to mount a generator or generator driving mechanism (not shown). A horizontal anchor rod 26, similar to anchor rod 22, has its ends connected to brackets 24 and 25, and rods 22 and 26 cooperate to hold the truck frame and equalizer against substantial relative movement transversely of the truck. Preferably each end of each anchor rod includes yielding elements 27 between which the adjacent truck member is clamped, and these elements provide for the inclination of the rod necessary to accommodate the relative vertical movement of the truck members, and while the thrust between the truck members longitudinally of the rod is slightly cushioned by elements 27, they do not provide for substantial relative movement of the parts lengthwise of the anchor rod.

Beams 11 and 16, supported by hangers 10 and 15, are secured to the lower ends of levers 28 and 29 respectively and support the latter and the connecting rod 30 between them. Lever 28 is a dead lever and its upper end is anchored by a link 31 to an upwardly projecting bracket 32 on the outer end of frame side piece 23. Lever 29 is a live lever and is connected by a rod 33 to a power source such as an air-actuated cylinder and piston (not shown). Levers 28 and 29 extend through slots S in frame arm 23 and are thus positioned transversely of the truck and guided during the application and release of the brakes.

Truck frame 8 also includes a bracket 34 projecting outwardly of the truck above springs 7 at one side of the journal box. The upper portion 5 of the equalizer includes a bracket 35 projecting outwardly of the truck at the opposite side of the journal box and aligned with bracket 34 longitudinally of the truck. An anchor rod 36 similar to rods 22 and 26 extends between brackets 34 and 35 and holds the equalizer and frame against substantial relative movement longitudinally of the truck without unduly resisting their relative vertical movement.

The load-carrying truck bolster 37 is suspended from the centrally positioned transoms 19 by swing hangers 38 in a well-known manner, and each end of the bolster includes an outwardly extending bracket 39, and an anchor rod 40 connects bracket 39 with a portion of bracket 34 below the part of the latter to which anchor rod 36 is attached. Anchor rod 40 holds the bolster against substantial movement longitudinally of the truck relative to the frame while yieldingly accommodating their relative movement transversely and vertically of the frame. Preferably anchor rods 36 and 40 and the brackets to which they are connected are not duplicated at the other end of the truck.

Each equalizer 4 is held against movement relative to its journal boxes 3 by upright elements 41 which oppose the sides of the box and by a detachable strap 42, the removal of which permits the replacement of a wheeled axle with its boxes without disassembly of other truck parts.

With the above described construction there is provided a pedestalless truck with brake gear movable vertically with the wheels and relative to the truck frame. The structure eliminates sliding action between the journal boxes and other truck parts, and between the bolster and truck frame. All of the longitudinal and transverse shocks between the main truck parts are cushioned by the anchor rods connecting these parts.

Another form of the invention is illustrated in Figures 5–8 in which the equalizer 50 corresponds generally to that previously described and the truck frame 51 is similarly mounted upon the equalizer by coil springs 52, but its side piece is positioned outwardly of the wheel instead of inwardly, as illustrated in Figure 1, and terminates in an end transom 53 positioned beyond the outer end of the equalizer. The brake gear is suspended from brackets 54 and 55 on the equalizer and includes a dead lever 56 and a live lever 57, the former being anchored to the truck frame by link 58.

A transverse anchor rod 59 and the truck equalizer and frame brackets to which it is connected are approximately the same as the corresponding parts previously described, and anchor rod 60 extends between a bracket 61 on the truck frame and the inner end of bracket 54 on the equalizer and functions similarly to the anchor rod 26 previously described.

Relative movement of the truck frame and equalizer longitudinally of the truck is resisted by an anchor rod 62 connected at its ends to brackets 63 and 64 on the truck frame and equalizer respectively. The rod 62 is above the journal box and abreast of the wheel extending in opposite directions from the plane of the wheel axis. This anchor rod corresponds to anchor rod 36.

An anchor rod 65 connects frame 51 and the truck bolster 66 similarly to anchor rod 40 previously described.

In other details this structure is like that previously described and the general objectives previously mentioned are similarly attained.

Other modifications of the truck may be made without departing from the spirit of the invention, and the exclusive use of those modifications coming within the scope of the claims is contemplated.

What is claimed is:

1. In a railway truck, spaced axles with wheels and journal boxes, an equalizer at each side of the truck extending longitudinally of the truck between and beyond the corresponding journal boxes and supported thereon, a truck frame including a central load-sustaining part between the axles, springs supporting the frame from the equalizers, the frame being free of association with the journal boxes except through the equalizers and including side pieces extending longitudinally of the truck between and beyond the axles, a member positioned between one of the axles and the adjacent end of the truck and connecting one of the frame side pieces and the adjacent equalizer, a member positioned between said axle and said load-sustaining part of the frame and connecting the frame and equalizer, said members holding the frame and said equalizer against relative movement transversely of the truck while accommodating their relative vertical movement.

2. Structure as described in claim 1 in which the spaced members connecting the equalizer and frame comprise elongated anchor rods extending transversely of the truck with their opposite ends secured to the equalizer and frame respectively and being positioned longitudinally of the truck beyond opposite sides of the wheel rim.

3. Structure as described in claim 1 which includes a device extending lengthwise of the truck and connected at one end to the equalizer at one side of the axle which is between the spaced members connecting the equalizer and frame and connected at its other end to the frame at the other side of said axle and holding the equalizer and frame against substantial relative movement longitudinally of the truck and yieldingly accommodating their relative movement vertically of the truck.

4. In a railway truck, an axle and wheel, a journal box carried thereby, an equalizer supported upon the journal box and extending longitudinally of the truck, the equalizer and journal box being movable together vertically of the truck and being held against relative movement longitudinally of the truck, a load carrying truck frame spring-supported on the equalizer and free of association with the journal box except through the equalizer, the frame including a side member extending longitudinally of the truck, means at opposite sides of the axle and connecting the equalizer and frame to hold the same against substantial movement relative to each other transversely of the truck, and brake gear supported from the equalizer independently of the frame and having elements applicable to the wheel and provided with substantially upright live and dead levers, the frame having elements positioning the levers transversely of the truck and guiding them in their movement during application and release of the brake.

5. In a railway truck, an axle and wheel, a journal box carried thereby, an equalizer supported upon the journal box and extending longitudinally of the truck at the outer side of the wheel, the equalizer and journal box being movable together vertically of the truck and being held against relative movement longitudinally of the truck, a load carrying truck frame spring-supported on the equalizer and free of association with the journal box except through the equalizer, the frame including a side member extending longitudinally of the truck at the inner side of the wheel, and means at opposite sides of the axle connecting the equalizer and frame to hold the same against substantial movement relative to each other transversely of the truck.

6. Structure as described in claim 5 in which the equalizer and frame connecting means comprises anchor rods extending transversely of the truck, one at the front of the wheel and one at the rear of the wheel.

7. In a railway truck, an axle and wheel, a journal box carried thereby, an equalizer supported upon the journal box and extending longitudinally of the truck to provide a spring seat at the outer side of the wheel, the equalizer and journal box being movable together vertically of the truck and being held against relative movement longitudinally of the truck, a load carrying truck frame spring-supported on the equalizer and free of association with the journal box except through the equalizer, the frame including a side member extending longitudinally of the truck at the inner side of the wheel and having a transverse transom above the level of the equalizer spring seat, a bracket on the equalizer extending inwardly of the truck and upwardly in the same general plane as the wheel and having a bracket for a brake beam hanger, an anchor rod with one end secured to said bracket and extending horizontally inwardly of the truck therefrom and having its other end secured to said frame transom.

8. In a railway truck, an axle and wheel, a journal box carried thereby, an equalizer supported on said journal box and extending longitudinally of the truck at the outer side of the wheel, the equalizer and journal box being movable together vertically of the truck and being held against relative movement longitudinally of the truck, a load carrying truck frame spring-supported on the equalizer and free of association with the journal box except through the equalizer, the frame including a side member extending longitudinally of the truck at the outer side of the equalizer, and anchor rods extending transversely of the truck at the front and at the rear of the axle, each having one end secured to said equalizer and the other end secured to said frame independently of similar structure at the opposite side of the truck.

9. Structure as described in claim 8 which also includes an anchor rod extending longitudinally of the truck abreast of the wheel with one end secured to the equalizer and its other end secured to the frame.

10. In a railway truck, an axle and wheels, journal boxes carried thereby, an equalizer at each side of the truck and supported upon the adjacent journal box and extending longitudinally of the truck, each equalizer and associated box being held against relative movement longitudinally of the truck and being movable together vertically of the truck independently of the other equalizer, a load carrying truck frame spring-supported on the equalizers and free of association with the journal box except through the equalizer, a brake shoe for engaging the wheel and supported from the equalizer independently of the truck frame, and elongated anchor rods extending transversely of the truck and connected at their end portions to at least one equalizer and to the adjacent side of the frame and constituting the sole means holding the equalizers and frame against substantial movement relative to each other transversely of the truck but accommodating their movement relative to each other in a vertical direction.

11. Structure as described in claim 10 which also includes an elongated anchor rod extending longitudinally of the truck with one end portion secured to the equalizer and its other end portion secured to the truck frame to hold the equalizer and frame against substantial movement longitudinally of the truck but accommodating their movement relative to each other in a vertical direction.

12. In a railway truck, spaced wheeled axles, journal boxes thereon, an equalizer extending between and supported upon journal boxes at one side of the truck, springs spaced apart longitudinally of the truck and carried by the equalizer, a truck frame supported by said springs and free of association with the journal boxes supporting the equalizer except through the equalizer, a load-carrying bolster supported from the truck frame, an elongated anchor rod extending transversely of the truck at the side of one axle and the associated journal box and positioned between the latter and the end of the truck and having a connection at one end to the equalizer and having a connection at its other end to the truck frame, and another elongated anchor rod extending transversely of the truck at the other side of said axle and journal box and between the latter and the bolster and having a connection at one end to the equalizer and at its other end to the truck frame, all of said connections readily accommodating angling of the anchor rods relative to the equalizer and truck frame to accommodate relative vertical movement of the latter but holding the equalizer and the truck frame against substantial relative movement transversely of the truck.

CHARLES F. FREDE.